United States Patent [19]
Parkes

[11] 3,863,685
[45] Feb. 4, 1975

[54] MONORAIL TRUCK TRAY LOADER

[76] Inventor: Ralph C. Parkes, Hancock & Lehigh Ave., Philadelphia, Pa. 19133

[22] Filed: July 10, 1973

[21] Appl. No.: 377,937

[52] U.S. Cl. ........................ 141/1, 141/11, 141/89, 141/98, 141/125, 141/232, 214/41, 214/52 C, 214/314
[51] Int. Cl. ............................................. B65b 1/04
[58] Field of Search ........... 141/1, 2, 10, 11, 85, 89, 141/98, 99, 231–233, 239, 124, 125, 131–134; 214/301, 314, 302, 52 C, 41; 425/DIG. 200, DIG. 201, 439

[56] References Cited
UNITED STATES PATENTS

| 2,215,735 | 9/1940 | Jones | 214/52 C |
| 3,190,494 | 6/1965 | Derror | 141/232 |
| 3,212,128 | 10/1965 | Carlson et al. | 425/DIG. 200 |
| 3,420,392 | 1/1969 | Flint | 214/301 |

*Primary Examiner*—Houston S. Bell, Jr.
*Attorney, Agent, or Firm*—Weiser, Stapler & Spivak

[57] ABSTRACT

A monorail tray truck loader which incorporates a longitudinally extending monorail, a tray containing truck movable along the monorail and supporting a plurality of material holding trays in horizontal arrangement, a loading station in alignment with the monorail and containing apparatus to rotate the tray truck for loading and leveling purposes, measuring cups movable into the loading station for depositing measured quantities of material to be dried into the trays when the trays are in a rotated position, and a plurality of rams movable relative to the tray truck for leveling the material within the trays.

22 Claims, 12 Drawing Figures

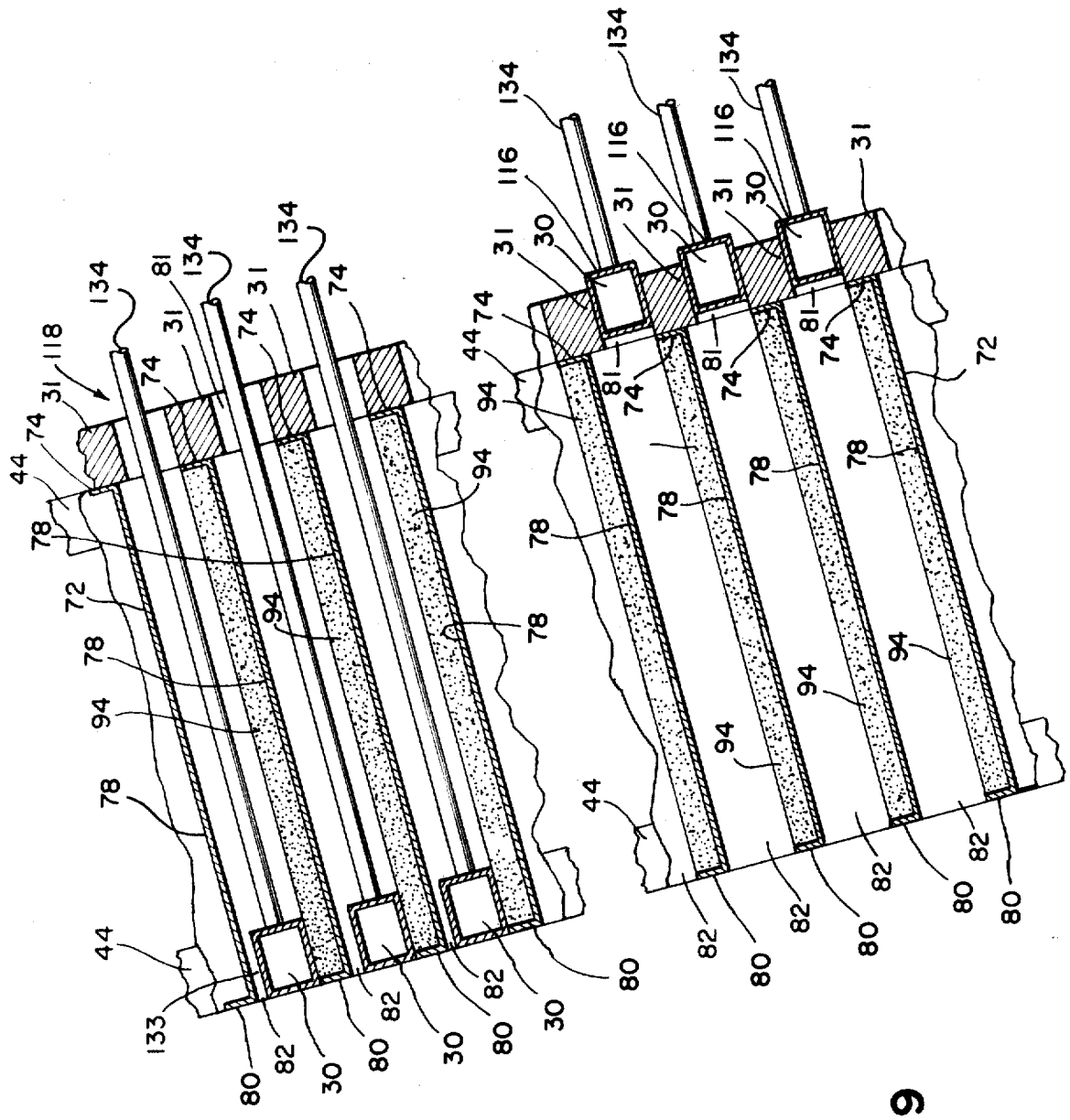

MONORAIL TRUCK TRAY LOADER

BACKGROUND OF THE INVENTION

The present invention relates generally to the art of material drying, and more particularly, is directed to a truck loading apparatus suitable for use with material in granular form.

Prior workers in the art have developed truck loading apparatus which employ manually loaded or machine loaded independent trays. In the case of granular materials, such as silica gel, the nature of the substance has always required manual operations to achieve the desired result. When large volumes of such material must be handled, the previous hand labor has resulted in greatly increased handling costs and in inefficient and slow loading procedures. When it was desired to treat the granular material, for example by drying in an oven, prior workers in the art have been unable to effectively automate the procedures for economically feasible, efficient operation.

SUMMARY OF THE INVENTION

The present invention relates generally to the field of tray loading systems, and more particularly, is directed to an automated tray dryer and tray loading system suitable for use with granular materials.

The device comprises a monorail upon which a tray truck rides in position to hold a plurality of trays in horizontal relation. The tray truck travels on the monorail through an automatic tray loading station which incorporates circular means for rotating the tray truck for granular material loading purposes. Following the loading operation, the tray truck can be directed further along the monorail to an oven dryer and an unloading station wherein the dry material is removed from the truck and is stacked for further treatment.

The loading station of the present invention comprises circular means to rotate the tray truck and the truck affixed trays. The loading station rotates the tray truck through 90° for tray loading purposes. The trays are spaced 4 inches apart and when rotated to the loading position, the 4 inch aperture is open at the top and closed at the bottom by rams. A multi-pocket tray loading assembly transversely rides beneath a material feed hopper for material filling. A controlled and rotating star feed is employed to accelerate or decelerate at uniform rate to fill the pockets with measured quantities of material for tray loading purposes. The tray loading assembly travels into the loading station to deposit the measured amounts of granular material into the previously rotated trays. Following the loading operation, the tray truck is rotated within the loading station back past the vertical a distance of approximately 15° to a leveling position. With the tray truck maintained in the leveling position, a plurality of rams travel on tracks within the loading station from an initial loading position and function forwardly to level the material in the trays by employing a screeding action. Following material leveling, the rams retract to the loading position and the tray truck is rotated back through 15° to the vertical. In this position, the fully loaded and leveled tray truck rides the monorail into the dryer wherein the required drying operation is performed. Following completion of the drying operations, the tray truck follows the monorail downstream of the oven and enters the unloading station.

The unloading station includes circular means similar in construction to the loading station and suitable to rotate the entire tray truck through an angular distance of 115° for tray unloading purposes. The fully dried material falls out of the trays when rotated through the 115° angle and is directed to a point of disposal by means of a chute. The rotating frame of the unloading station is totally enclosed to prevent dusting.

The use of the measuring cups or pockets which horizontally travel relative to the tray truck permits filling the trays with measured quantities with great accuracy and without great expense. In this manner, precisely measured quantities of granular material, such as silica-gel, can be introduced into each tray in an automated manner. By functioning the leveling rams with the trays rotated through 15°, the forces of gravity can be utilized to drip unwanted silica-gel from the top surfaces of the rams without requiring additional cleaning.

It is an object of the present invention to provide an improved monorail tray truck loader of the type set forth.

It is another object of the present invention to provide a novel monorail tray truck loader which incorporates a monorail, a tray truck movable along the monorail and means to rotate the tray truck for loading purposes.

It is another object of the present invention to provide a novel monorail tray truck dryer including a monorail, a truck movable along the monorail and containing trays in horizontal, vertically spaced arrangement for holding material to be dried, a loading station in alignment with the monorail and containing means to rotate the tray truck through 90° for loading purposes, measured means capable of entering the loading station after the tray truck has been rotated through 90° for loading the trays, ram means transversely traveling within the loading station for leveling the material in the trays following the tray loading operation, the said monorail carrying the tray truck into an oven following the leveling operation for material drying purposes.

It is another object of the present invention to provide a novel monorail tray loading system suitable for drying granular material such as silica-gel, and including monorail means, tray means movable along the monorail, rotary loading means to rotate the tray means through 90° for loading purposes, measured loading means movable into the rotary loading means for loading the trays in the rotated position, ram means movable relative to the rotary means to level the silica-gel within the trays, oven means to dry the silica-gel after leveling and rotary unloading means suitable to rotate the tray means through 115° for silica-gel unloading following the drying procedures.

It is another object of the present invention to provide a novel monorail tray loading system suitable to handle granular materials such as silica-gel and to dry precisely measured quantities of the granular materials under precisely controlled drying conditions.

It is another object of the present invention to provide a novel monorail tray loading system which is designed to load and transport silica-gel in a completely automated manner, to dry the material and to automatically unload the dried material automatically.

It is another object of the present invention to provide a novel monorail tray loading system that is rugged in construction, automated in operation and trouble free when in use.

Other objects and a fuller understanding of the invention will be had by referring to the following description and claims of a preferred embodiment thereof, taken in conjunction with the accompanying drawings, wherein like reference characters refer to similar parts throughout the several views and in which:

BRIEF DESCRIPTION OF THE DRAWINGS

FIG. 3A is a perspective view at reduced scale, of one of the trays of the tray truck.

FIG. 8 is a partial, detailed, sectional view showing the position of the rams with the parts in the condition of FIG. 6.

FIG. 9 is a view similar to FIG. 8 showing the position of the rams with the parts in the condition of FIG. 7.

DESCRIPTION OF THE PREFERRED EMBODIMENT OF THE INVENTION

Figure 1:
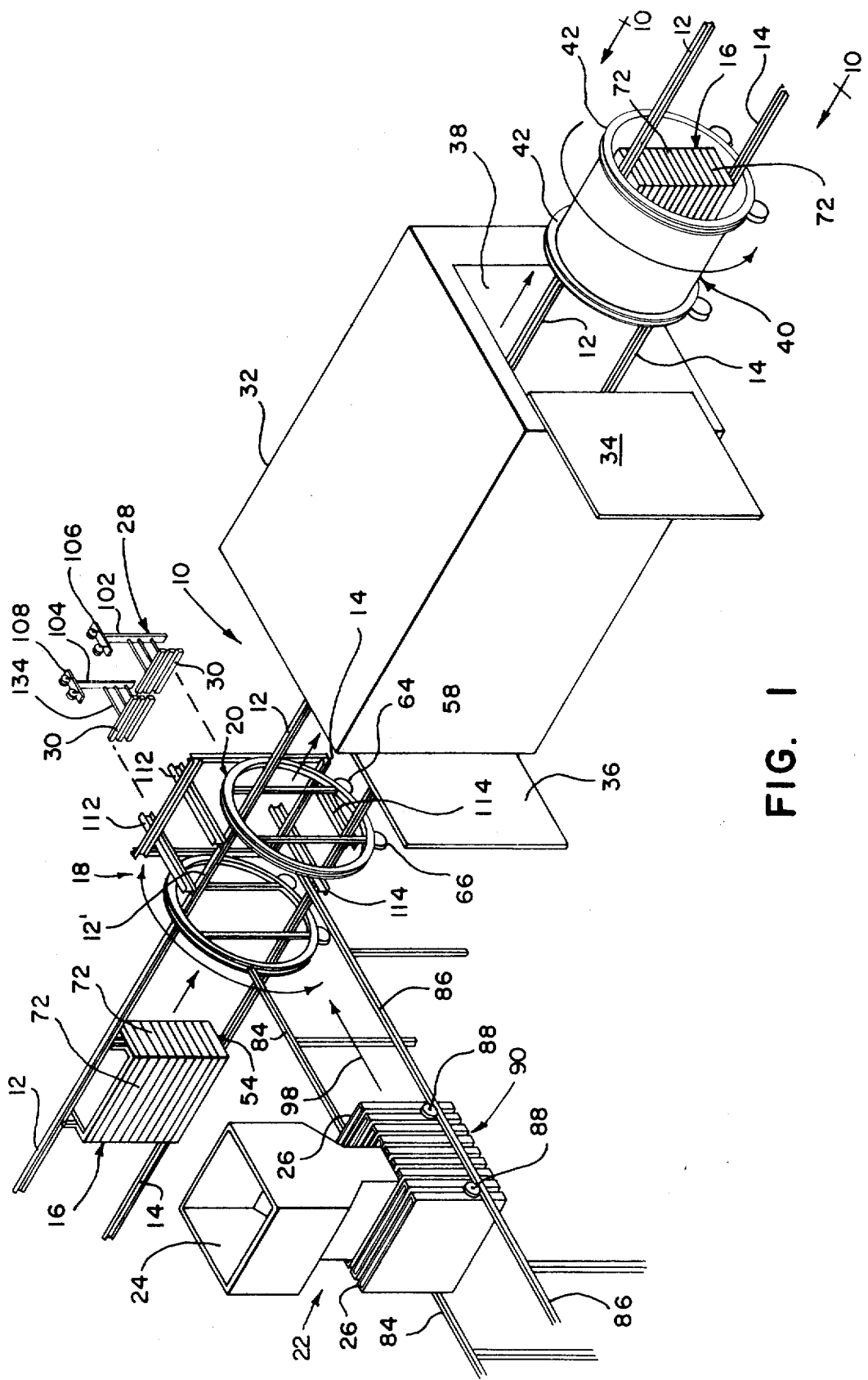
FIG. 1 is a schematic, perspective view of the apparatus employed in the monorail tray loading system of the present invention.

Although specific terms are used in the following description for the sake of clarity, these terms are intended to refer only to the particular structure of my invention selected for illustration in the drawings, and are not intended to define or limit the scope of the invention.

As employed herein, the measuring cups are defined as meaning pockets of predetermined volume which are open at the top and which, when filled, deliver measured quantities of granular material to the trays.

The trays, as herein described include a plurality of vertically spaced containers which are fixedly connected to the tray truck in permanent manner and which are not individually removable therefrom.

Referring now to the drawings, I show in FIG. 1 a monorail truck tray loader system 10 incorporating a longitudinally extending monorail 12 which may be a conventional I-beam and a lower, vertically aligned track 14 in cooperative arrangement with the monorail to facilitate movement of the tray truck 16 in the manner hereinafter more fully set forth. The monorail 12 leads through a tray loading station 18 having circular means 20 which is capable of rotating the tray truck 16 through 90° for tray filling purposes.

A material loading station 22 positions transversely of the tray loading station 18 and includes an upper hopper 24 and a plurality of measuring cups or pockets 26 which are horizontally movable from a metering position 90 beneath the hopper 24 to a filling position 92 (FIG. 5) within the tray loading station 18. A material leveling station 28 is transversely movable within the tray loading station 18 and incorporates a plurality of vertically spaced rams 30 which serve to level the material 94 within the various trays 72 prior to introduction into the oven 32. The monorail 12 and lower track 14 lead from the tray loading station 18 through the oven 32 which is equipped with manual or automatic operating forward and rearward doors 34, 36 which conventionally close the oven openings 38 upon entrance of a loaded tray truck 16 for material drying purposes. From the oven 32, the monorail beam 12 and lower guide track 14 convey the tray truck 16 with the oven dried material therein to a tray unloading station 40 wherein circular means 42 are provided to rotate a tray truck 16 through an angular distance of 315° for material unloading purposes. While it is appreciated that the monorail tray truck loading system is illustrated for use with a dryer 32 and a tray unloading station 40, the apparatus of the tray loading system should not be limited in its application to such use. After tray loading in accordance with the teachings of this specification, the material may be transported to any other type of material treating apparatus.

Figure 2:
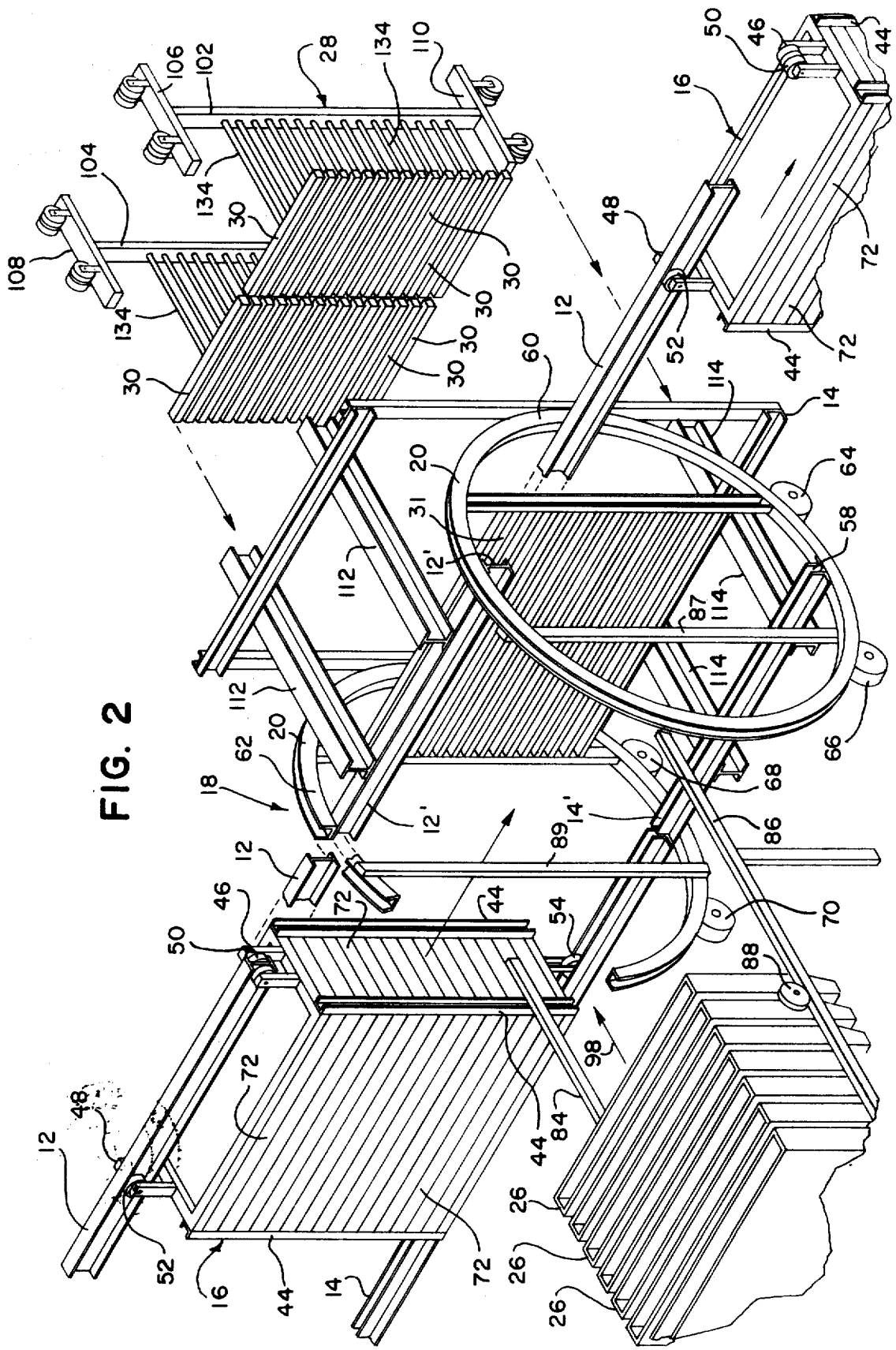
FIG. 2 is a detailed, perspective view of the tray loading station.

Referring now to FIG. 2, I show the tray truck 16 riding between the upper monorail beam 12 and the lower guide track 14 and comprising generally a channel iron frame 44 which upwardly carries the forward and rearward yokes 46, 48 within which are journaled the forward and rearward pairs 50, 52 of monorail engaging wheels. The tray truck 16 is additionally provided with lower forward and rearward wheels 54, 56 which are suitably journaled to the frame in conventional manner to ride within the central area 58 defined by the lower track 14. The monorail 12 and lower track 14 terminate at the tray loading station 18 wherein a similar monorail beam 12' and a similarly configured lower track 14' respectively longitudinally align to permit the tray truck 16 to ride directly into the tray loading station 18 without interruption. By splitting the monorail beam extension 12' and lower track extension 14' from the respective monorail beam 12 and lower track 14, the monorail extension 12' and lower track extension 14' can then be rotated within the tray loading station 18 through action of the circular means 20 as hereinafter more fully set forth.

Still referring to FIG. 2, it will be seen that the monorail beam extension 12' and lower track extension 14' are fixedly secured, such by bolting or welding to the circular means 20 to rotate simultaneously as circular means rotate. Preferably, the circular means 20 includes a forward annular ring 60 and a rearward annular ring 62 which are conventionally rotated by the power drive gears 64, 66, 68, 70. In accordance with usual practice, either one or both of the pairs of power drive gears 64, 66, 68 and 70 may be rotated by a motor power source (not shown) to rotate the forward and rearward annular rings 60, 62. In a preferred type of construction, both the power driving gears 64, 66 and their associated ring 60 and the rearward power driving gears 68, 70 and their associated rearward annular ring 62 could be constructed with gear teeth (not illustrated) of suitable pitch and design to properly mesh to thereby transfer rotative action of the respective power driving gears to the forward and rearward annular rings 60, 62. It will be noted that when the annular rings 60, 62 are rotated through action of the power driving gears 64, 66, 68, 70, the monorail beam extension 12' and lower track extension 14' will be similarly rotated. Thus, by first rolling a tray truck 16 onto the rail and track extensions 12', 14' when the extensions longitudinally align with the monorail beam 12 and the lower track 14, the tray truck 16 itself will also be rotated by operation of the respective power driving gears 64, 66, 68, 70.

Figure 3:
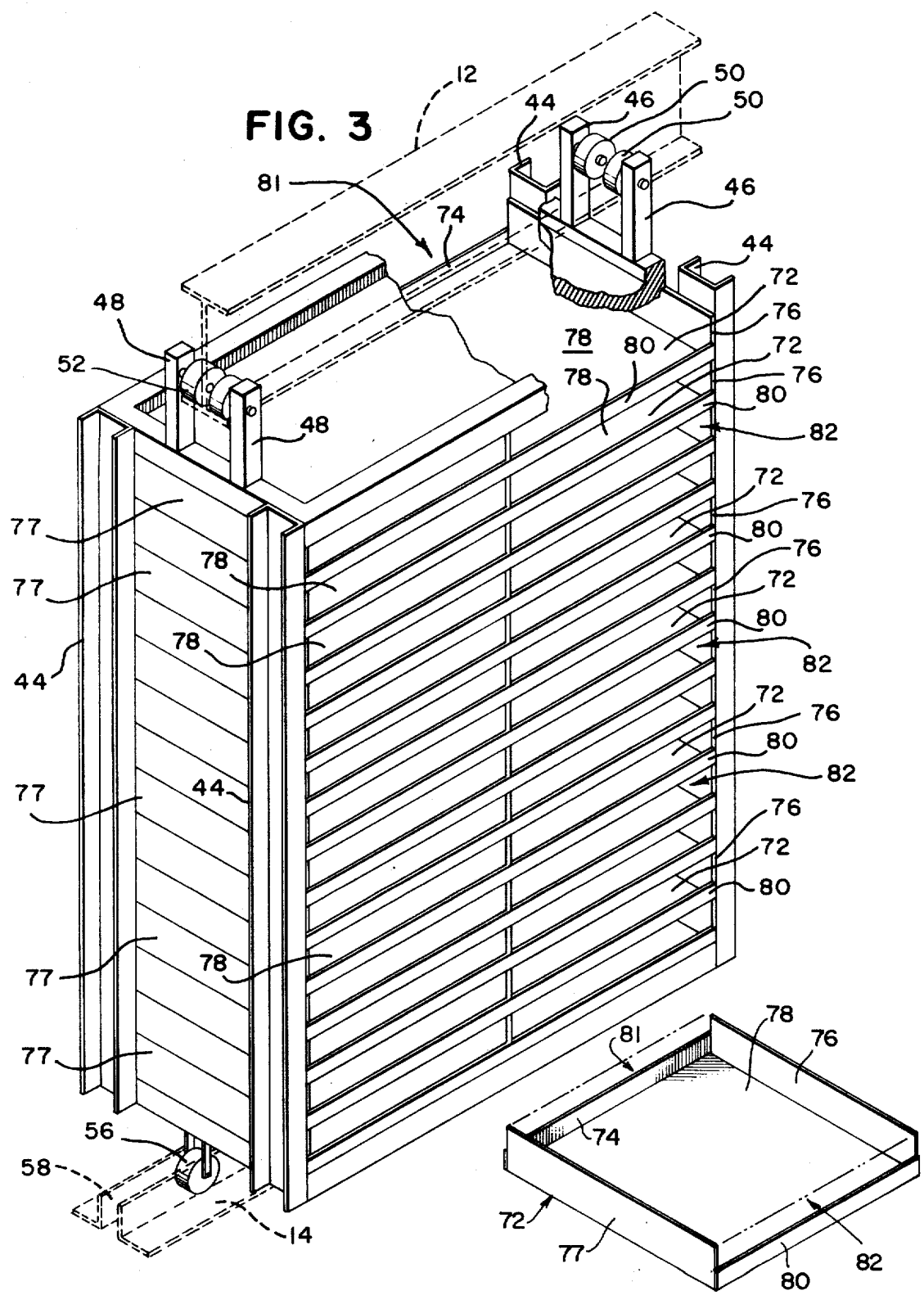
FIG. 3 is an enlarged, perspective view of the tray truck, partially broken away to expose details of interior construction and with the monorail shown in phantom lines for purposes of association.

As best seen in FIGS. 3 and 3A, the tray truck 16 carries a plurality of vertically spaced, horizontally oriented trays 72 each of which is constructed with a back 74, closed sides 76, 77 and a bottom 78 which integrally joins the back 74 and the sides 76, 77. The front of each tray is open for material loading purposes and incorporates a front panel 80. The front panel 80 integrally bends upwardly from the bottom 78 and is shorter in height than the sides 76, 77, to define a horizontal, open space 82 at the front of each tray which is employed for filling and leveling purposes as hereinafter more fully set forth. Similarly, the panels 74 define rearwardly positioned, horizontal open spaces 81 which are closed by the rams 30 during filling as more fully described herein.

Downstream of the tray loading station 18, the monorail beam 12 and lower track 14 continue in longitudinal alignment to carry the tray trucks 16 through the oven 32 for material drying purposes. The tray trucks 16 are carried upon the monorail beam 12 and lower track 14 through the oven to the tray unloading station 40 wherein the second circular means 42 serves to rotate the tray truck 16 through 115° to unload the fully dried material. The monorail beam and lower track are similarly cut at the unloading station 40 as at the tray loading station 18 to provide an aligned monorail beam extension 12" and lower track extension 14" to permit rotating the tray 16 in the tray unloading station 40.

Figure 4:
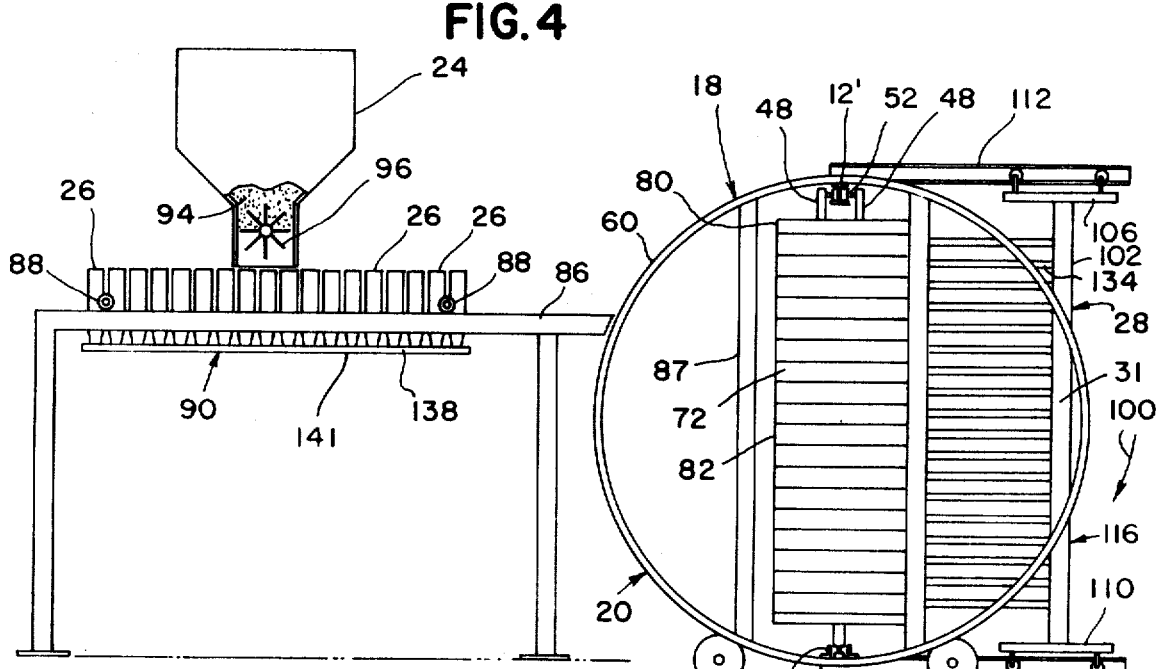
FIG. 4 is a schematic, elevational view of the parts in the tray loading station with the tray track in initial vertical position supporting the trays in horizontal alignment.
Figure 5:
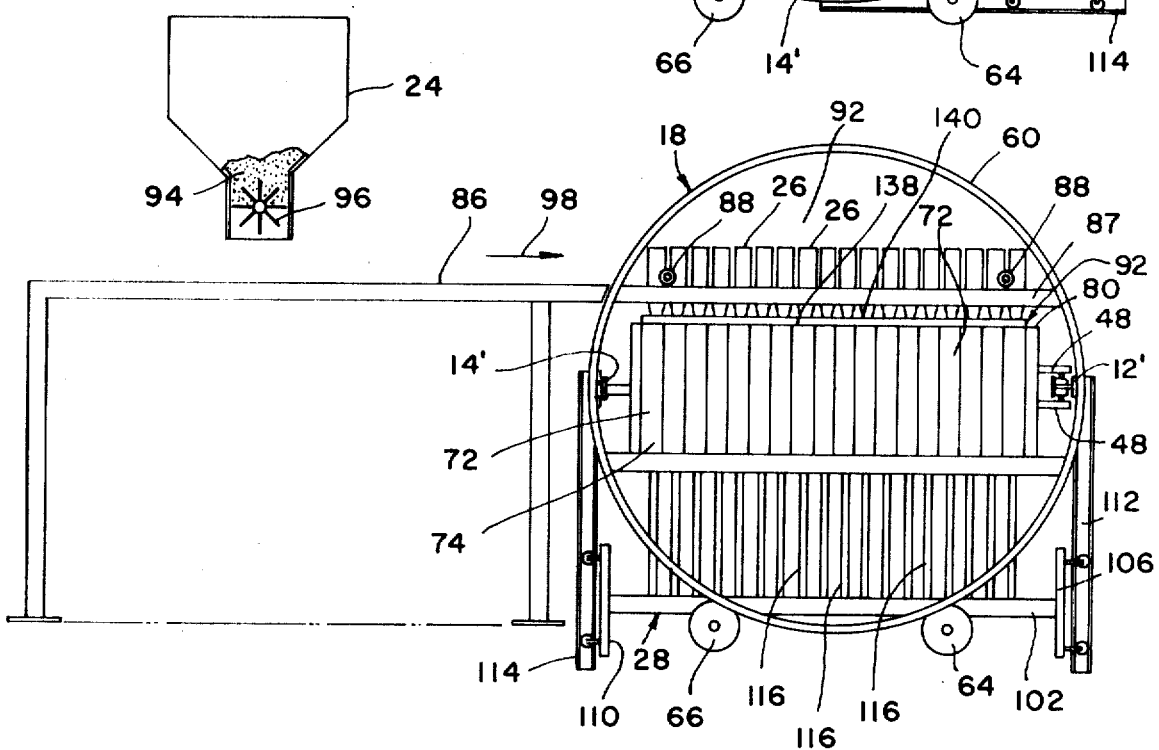
FIG. 5 is a view similar to FIG. 4 showing the arrangement of parts with the tray truck rotated to the loading position and with the measuring cups moved to the filling position.

Referring now to FIG. 4, the entrance of the tray truck 16 into the tray loading station 18 will now be described. The tray truck 16 rides upon its respective upper and lower rollers 50, 52, 54, 56 upon the upper monorail beam 12 and the lower guide track 14 until the truck reaches the tray unloading station 18 wherein the monorail beam extension 12' and the lower track extension 14' initially longitudinally align with the monorail beam 12 and lower track 14 to permit the truck to roll into the tray loading station. In this position, the backs 74 of the trays 72 face to the right as viewed in FIG. 4 and the front panels 80 and the horizontal open spaces 82 of each tray face to the left as viewed in FIG. 4. The material leveling station 28 is moved to position the individual rams 30 within the spaces 81 to thereby close these openings. The measuring cups 26 ride upon a pair of spaced beams 84, 86 on suitable wheels 88 from a metering position 90 wherein the measuring cups or pockets position beneath the material hopper 24 as illustrated in FIGS. 1 and 4 to a filling position 92 as illustrated in FIG. 5. Sufficient structure in the form of a tray loading assembly is provided to maintain all of the individual measuring cups 26 in horizontal, spaced alignment as illustrated and to rotatively journal the wheels 88 for rolling movement along the beams 84, 86. It will be noted that the loading station 18 is equipped with a pair of vertical beams 87, 89. The beams 87, 89 affix to the circular means 20 and are rotated thereby to form extensions of the measuring cup beams 84, 86 when the tray truck 16 is rotated through 90° as in FIG. 5.

A granular material 94, such as silica gel, is conventionally loaded into the hopper 24 where it is fed by gravity through the star wheel feeder 96 into the individual measuring pockets 26. The rotating star feed is used to accelerate or decelerate at uniform rate the amount of material 94 to fill the measuring pockets 26. A plow or scraper (not shown) to level the pockets exactly to thus assure that the exact predetermined quantity of material is supplied. The cups 26 are moved horizontally beneath the material hopper 24 to permit each cup to be filled with a predetermined quantity of the granular material, the quantity being controlled by the volume of each pocket 26. The star wheel feeder 96 is employed to control flow rates and uniformity during the filling operation. Once the cups are filled, they are wheeled in unison along the beams 84, 86 in the direction of the arrow 98 (FIGS. 1 and 2) toward the tray loading station 18. As best seen in FIGS. 4 and 5, once the tray truck 16 is fully positioned within the tray loading station 18, the power driving gears 64, 66, 68, 70 are activated by the power means (not illustrated) to rotate the forward and rearward annular rings 60, 62 in the direction of the arrow 100 to assume the position illustrated in FIG. 5. As shown, the annular rings are rotated through 90° to angularly offset the tray truck 16 through 90°. In this position, the partially closed backs 74 of the trays position downwardly and the horizontal open spaces 82 defined at the front panel 80 of each tray face upwardly. The measuring cups 26 are rolled across the beams 84, 86 and the rotatively aligned beams 87, 89 until each measuring cup vertically aligns over a horizontal open space 82 of a tray 72. The material which is in granular form which has been metered into the cups 26 is then allowed drop by gravity into the bottom of each tray area 74 wherein it will substantially fill approximately the bottom one-third of each tray area in the manner hereinafter more fully set forth. With the trays thus filled, the measuring cups are then reciprocated from the filling position 92 as in FIG. 5 to the metering position 90 as in FIGS. 1, 4, 6 & 7.

As best seen in FIGS. 1, 2, 4, 5, 6 and 7, a plurality of vertically spaced rams 30 are carried upon upright posts 102, 104. The posts terminate upwardly in upper trolleys 106, 108 and lower trolleys 110, only one of which is illustrated in FIG. 2. The trolleys roll on respective upper tracks 112 and lower tracks 114 to move the plurality of rams 30 from an initial position 116 (FIGS. 4 and 5) in the direction of the arrow 117 to a leveling position 118 as in FIG. 6. Upon completion of the leveling operation, the upper and lower trolleys return the rams 30 to the initial position 116 by movement in the direction of the arrow 120. See FIG. 7.

Referring now to FIGS. 5, 8 and 9, it will be seen that the tray backs 74 define an open space 81 between the horizontally spaced trays 72. When a tray truck 16 is rotated through 90° to vertically orient the trays 72 with the horizontal open spaces 82 facing upwardly as in FIG. 5, the rams 30, when in the initial position 116, locate within each rear open space 81 to substantially close the speces between trays. Thus, with the parts in the position of FIG. 5, when the silica gel 94 is dumped into the trays 72 from the measuring cups 26, the rams 30 serve to retain the material in the trays so that approximately one-third of each tray area at the bottom (when in the rotated vertical position) is filled with the granular material 94.

Figure 6:
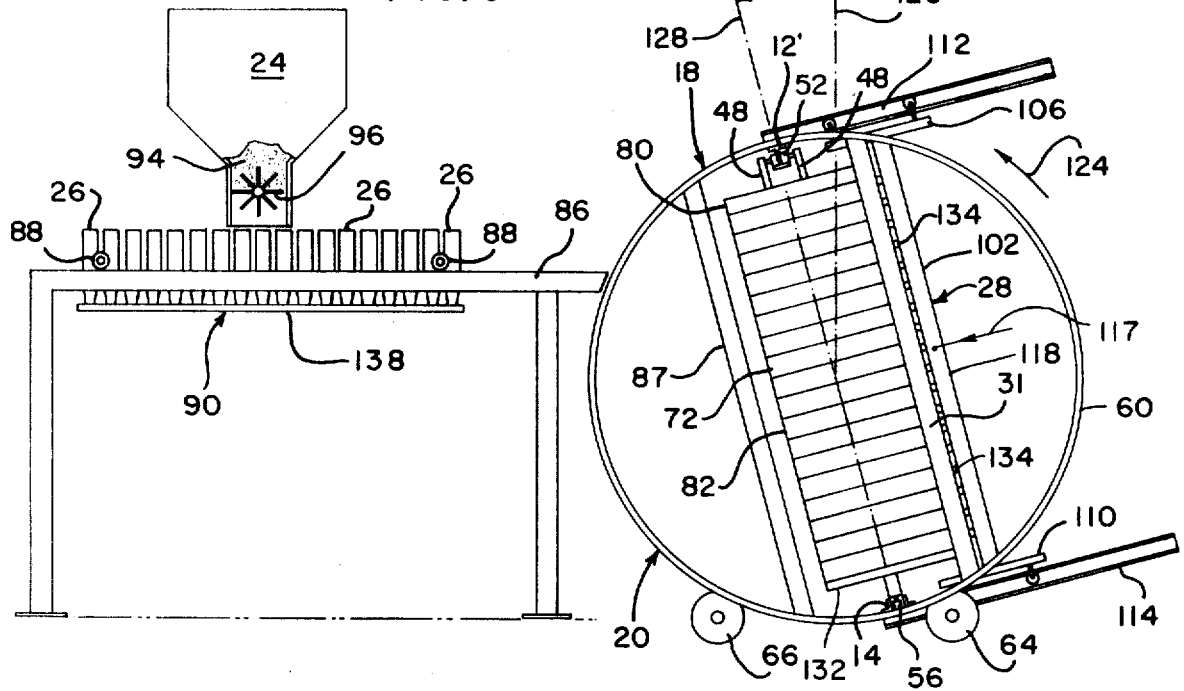
FIG. 6 is a view similar to FIG. 4 showing the general arrangement of parts when the rams are forwardly urged to the leveling position.
Figure 7:
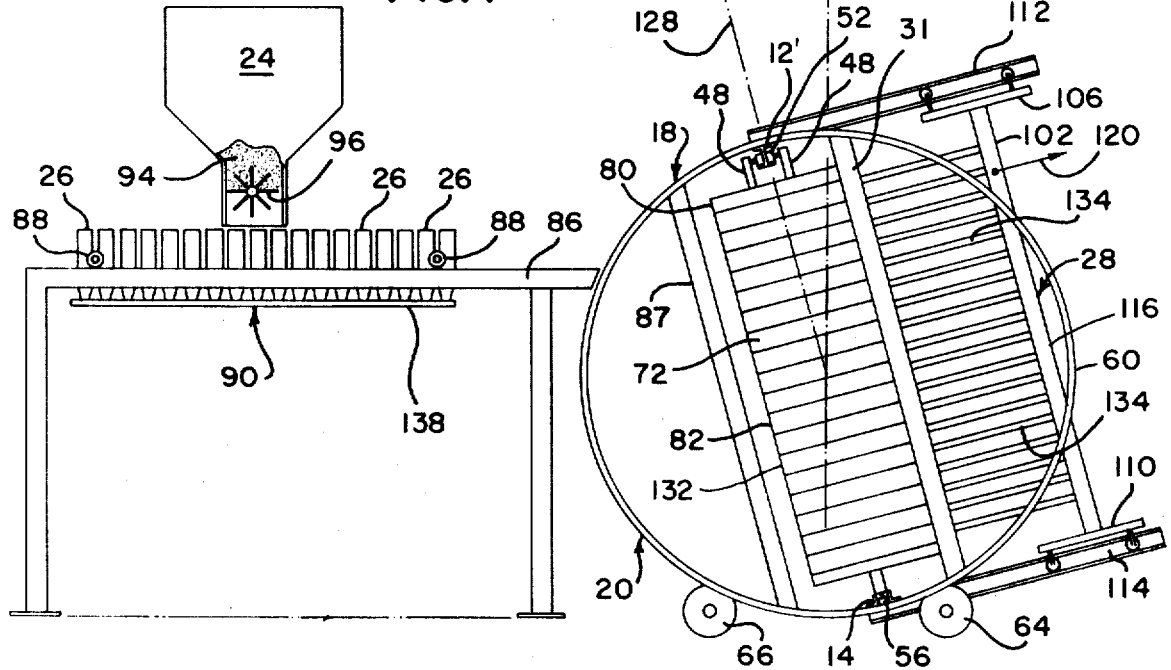
FIG. 7 is a view similar to FIG. 6 showing the rams returned to their initial position.

After filling, the measuring cups are rolled back to the metering position 90 as in FIG. 6 and the tray loading station 18 is rotated in the direction of the arrow 124 through the vertical 126 to an axis 128 which is rotated 15°, as indicated by the arrow 130, from the vertical axis 126. It will be noted that when the tray truck 16 is rotated to the inclined position 132 as in FIGS. 6 and 7, the upper and lower tracks 112, 114 are similarly inclined inasmuch as they are affixed directly to the forward and rearward annular rings 60, 62. Thus, when the circular means 20 rotate the tray loading station 18, the rams 30 are similarly inclined inasmuch as the rams travel upon the upper and lower tracks 112, 114 through action of the upper trolleys 106, 108 and lower trolleys 110.

The rams 30 are affixed to the respective upright posts 102, 104 by a plurality of horizontal, vertically spaced arms 134 which function the rams from an initial position 116 (FIGS. 4 and 5) to a leveling position 118 as in FIGS. 6 and 8. Following the leveling operations, the rams are returned to the initial position 116 (see FIGS. 7 and 9). The rams 30 ride in parallel relationship with the trays 72 and serve to level the silica gel material 94 within each tray. As best seen in FIGS. 8 and 9, the rams are fabricated to a depth just sufficient to close the rear open space 81 at the rear of each tray 72 and each ram is positioned a predetermined distance above the associated tray bottom 78 for material leveling purposes. The inclined position 132 facilitates pushing the silica gel 94 from the initial dumped position against the face of the rams as in FIG. 5, to a downwardly inclined position as in FIGS. 6 and 8. The incline of the trays, when in the inclined position 132, facilitates movement of the granular silica gel 94 to thereby permit precise leveling within each tray 72. Additionally, should any silica gel inadvertently be deposited on the top 133 of a ram 30 during the leveling operation, the 15° incline will act to urge the material to drop into the tray 72 through action of the forces of gravity.

As best seen in FIGS. 4 and 5, a gate 138 is provided in the tray loading station 18 of suitable size to overfit the front panels 80 of the trays 72. During filling, the gate is maintained in the closed position 141 so that the granular material is retained within the pockets 26. When the tray truck is initially rotated to the tray filling position as in FIG. 5, the gate is moved from its initial closed position 141 to an open position 140 in a manner to communicate each pocket or cup 26 with an open spaced 82 at the front of each tray. Upon positioning the measuring cups 26 in vertical alignment over the trays 72, the gate is functioned to the open position 140. When the cups 26 align with the spaces 82 and with the gate in open position 140, the silica gel 94 is then dumped by gravity into the vertically oriented trays. It will be remembered that the rams 30 close the rear openings 81 during the tray filling procedures by slidingly fitting within the ram openings provided in the rear guide 31 to prevent escape of the material 94. Following completion of the tray filling procedures, the gate 138 is returned to its initial position 141.

The filled and levelled trays of FIG. 9 are then rotated back through 15° until the beams 12 and 12' and the tracks 14, 14' align. The tray truck 16, with the filled and levelled trays then is directed into the oven 32 as in FIG. 1 wherein the required drying procedures are carried out. The oven doors 34, 36 are closed and the oven 32 operated as required to achieve the desired degree of drying. Upon completion of the drying operations, the tray truck 16 proceeds along the monorail 12 and centers the tray unloading station 40. It will be noted that the tray unloading station is equipped with an upper monorail 12'' and a lower track 14'' which initially align with the monorail 12 and lower track 14 to receive the tray truck 16.

Figure 10:
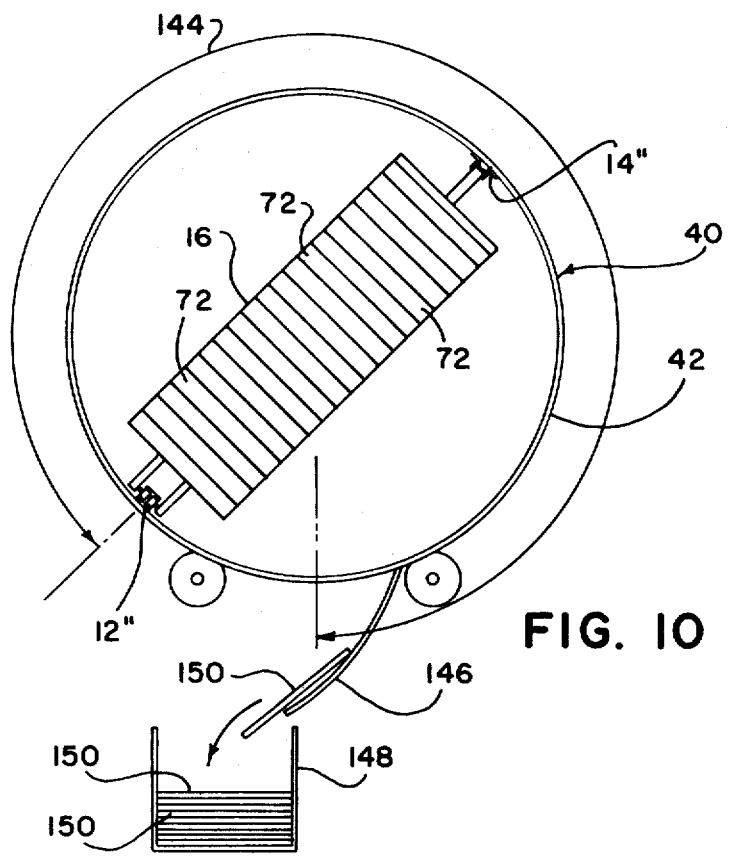
FIG. 10 is an enlarged, elevational view looking along Line 10—10 of FIG. 1, showing the position of parts with the tray in the unloading position.
Figure 11:
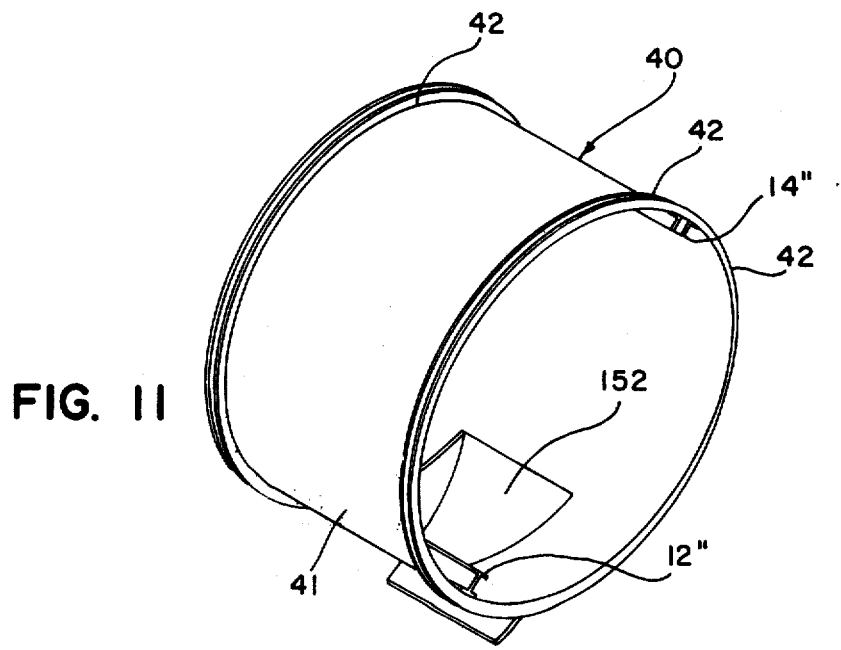
FIG. 11 is a perspective view of the unloader of FIG. 10.

The circular means 42 are rotated in a manner similar to the rotation of the circular means 20 until the tray truck 16 is rotated through an angle of 115° from the vertical as indicated by the arrow 144 in FIG. 10. The fully dried product 150, which is now in solid form, exits the trays 72 through the back open spaces 81 and enters the opening 152 which is provided in the tray unloading station 40. If desired a trap door 146 can be provided in well known manner to direct the dried material 150 to a desired area, for example, a chute or bin 148 where it is then available for further processing. The tray unloading station 40 is preferably equipped with an enclosing dust cover 41 to prevent dusting.

Although I have described the present invention with reference to the particular embodiments therein set forth, it is understood that the present disclosure has been made only by way of example and that numerous changes in the details of construction may be resorted to without departing from the spirit and scope of the invention. Thus, the scope of the invention should not be limited by the foregoing specification, but rather only by the scope of the claims appended hereto.

I claim:

1. In a monorail tray truck loader wherein a truck containing a plurality of trays is processed, the combination of
   A. track means to convey the tray truck through the system;
   B. a tray loading station in alignment with the track means and receiving the tray truck,
      1. said tray loading station including circular means to angularly rotate the tray truck to a loading position for loading purposes; and
   C. measured loading means movable into the tray loading station for loading material into the trays in the rotated position.

2. The invention of claim 1 wherein the tray loading station includes rams which are movable from a first position to a second position, the movement of said rams serving to level the material within the trays.

3. The invention of claim 2 wherein the rams are angularly rotated by the said circular means.

4. The invention of claim 3 wherein the measured loading means include a plurality of measuring pockets, the said pockets being movable into the tray loading station by riding upon a first pair of spaced beams.

5. The invention of claim 4 wherein the circular means carry a second pair of spaced beams, the said second pair of spaced beams being rotated into alignment with the first pair of spaced beams by the circular means when the tray truck is rotated to the loading position, whereby the measuring cups ride upon the second pair of spaced beams to a position in vertical registry above the tray truck.

6. The invention of claim 5 wherein the tray truck is rotated by the circular means through an angle of 90° to the loading position.

7. The invention of claim 6 wherein each tray includes a pair of spaced, closed sides, an open front and a bottom joining the said sides, the said trays being loaded through the open front when rotated to the loading position.

8. The invention of claim 7 wherein the loaded tray truck is rotated to an angularly downwardly inclined leveling position by the circular means.

9. The invention of claim 8 wherein the rams move within the tray loading station over the trays from an initial position to a leveling position to level the material within the trays.

10. The invention of claim 9 wherein the rams move in downwardly inclined planes between the initial position and the leveling position, said planes being parallel to a plane drawn through the trays when the tray truck is rotated to the said leveling position.

11. The invention of claim 10 wherein the trays have open backs and wherein the rams, when in the initial position, close the open backs.

12. The invention of claim 5 and material treating means to treat the material within the trays, said material treating means being in alignment with the truck means to receive the loaded tray truck therefrom.

13. The invention of claim 12 wherein the material treatment means is an oven.

14. The invention of claim 10 wherein the said planes decline from the horizontal at an angle of 15°.

15. The method of loading material in granular form comprising the steps of
A. stacking a plurality of trays having open fronts horizontally in a tray truck;
B. moving the tray truck in an initial position into a tray loading station;
C. rotating the tray truck within the tray loading station to a loading position to face the open fronts vertically upwardly;
D. moving a plurality of filled measuring pockets into the tray loading station and vertically aligning the pockets over the open fronts;
E. dumping the material from the filled measuring pockets into the trays;
F. rotating the tray truck to a leveling position; and
G. leveling the material within the trays when the tray truck is maintained in the leveling position.

16. The method of claim 15 and the additional step of filling the measuring pockets with precisely controlled quantities of the material.

17. The method of claim 16 and the additional step rotating the tray truck to an angularly downwardly inclined position when in the leveling position.

18. The method of claim 17 wherein the tray truck is rotated through an angle of 15° downwardly from the horizontal when in the leveling position.

19. The method of claim 18 and the additional step of moving rams over the trays from an initial position to a leveling position when the tray truck is maintained in the leveling position to level the material.

20. The method of claim 19 and the additional step of moving the tray truck with the leveled material into a material treatment station for material treatment purposes.

21. The method of claim 20 and the additional step of rotating the tray truck to separate the treated material from the trays.

22. The method of claim 20 wherein the material is dried within the material treatment station.

* * * * *